United States Patent [19]
Marcovici

[11] Patent Number: 5,931,062
[45] Date of Patent: Aug. 3, 1999

[54] EFFICIENT MECHANICAL RECTIFIER

[76] Inventor: Mitch Marcovici, 309 Livingston Ave., Murray Hill, N.J. 07974-2309

[21] Appl. No.: 08/854,908

[22] Filed: May 13, 1997

[51] Int. Cl.$^6$ ..................................................... B25B 17/00
[52] U.S. Cl. ........................... 81/57.31; 81/57.22; 81/58; 81/177.2
[58] Field of Search ................................ 81/57.36, 57.3, 81/467, 473, 475, 21, 48.92, 177.2; 192/51; 116/115

[56] References Cited

U.S. PATENT DOCUMENTS

| | | |
|---|---|---|
| Re. 28,561 | 9/1975 | Stephens . |
| 708,579 | 9/1902 | Nutry . |
| 892,408 | 7/1908 | Custer . |
| 1,860,914 | 5/1932 | Wellman . |
| 2,542,015 | 2/1951 | Ellison . |
| 2,641,136 | 6/1953 | Marsden et al. . |
| 3,232,149 | 2/1966 | Duchesne .............................. 81/57.31 |
| 3,666,063 | 5/1972 | Schoeman et al. . |
| 3,711,065 | 1/1973 | Lawrence . |
| 3,712,155 | 1/1973 | Stonnel et al. . |
| 3,783,955 | 1/1974 | Gill ....................................... 81/57.22 |
| 3,868,983 | 3/1975 | Newcomb ................................ 81/59.1 |
| 3,983,759 | 10/1976 | Linden . |
| 3,992,964 | 11/1976 | Osmond . |
| 4,210,185 | 7/1980 | Acevedo ..................................... 81/58 |
| 4,357,844 | 11/1982 | Welbon . |
| 4,366,731 | 1/1983 | Vallevand . |
| 4,426,895 | 1/1984 | Lack . |
| 4,427,100 | 1/1984 | Rude et al. . |
| 4,440,517 | 4/1984 | Potter et al. ............................ 81/177.2 |
| 4,474,089 | 10/1984 | Scott . |
| 4,507,990 | 4/1985 | Lack . |
| 4,754,670 | 7/1988 | Raymond ............................... 81/177.2 |
| 4,802,387 | 2/1989 | Williams, III .......................... 81/57.31 |
| 4,905,548 | 3/1990 | Colace et al. .......................... 81/177.2 |
| 4,970,915 | 11/1990 | Williams, III . |
| 5,009,132 | 4/1991 | Gilberto . |
| 5,115,699 | 5/1992 | Mertens . |
| 5,125,297 | 6/1992 | Bai et al. . |
| 5,136,888 | 8/1992 | Nix . |
| 5,176,038 | 1/1993 | Inokuchi . |
| 5,176,047 | 1/1993 | Bai et al. . |
| 5,333,517 | 8/1994 | Bryson . |
| 5,386,745 | 2/1995 | Inokuchi . |

FOREIGN PATENT DOCUMENTS

| | | | |
|---|---|---|---|
| 288974 | 2/1971 | U.S.S.R. ................................ | 81/57.31 |

*Primary Examiner*—David A. Scherbel
*Assistant Examiner*—Joni B. Danganan

[57] ABSTRACT

A mechanical rectifier efficiently rectifies or converts alternative clockwise and counterclockwise rotation of a main handle or other active driving element into unidirectional rotation of a main shaft. This mechanical rectifier is useful in manual tools such as a "no-waste screwdriver", which eliminates the wasted hand motion inherent in all ordinary hand tools, and in energy-saving devices such as a wave-powered electrical generator. The basic mechanical rectifier includes a shaft, two driving elements, and a reversing mechanism coupling the two driving elements so that they can only rotate in opposite directions. Each of the two driving elements has a separate one-way roller clutch pressed in its bore in proper orientation and riding on the shaft so that, whichever direction a driving element is rotated, it always turns the shaft in the same direction. Therefore, a tool bit at one end of the shaft always serves to tighten a fastener, while a tool bit at the opposite end only serves to loosen a fastener. To switch from tightening a fastener to loosening it (or vice versa), the main handle is pulled out of engagement with a hub of one driving element and inserted for engagement with a hub of the opposite driving element.

16 Claims, 9 Drawing Sheets

EFFICIENT MECHANICAL RECTIFIER

FIELD OF THE INVENTION

The present invention relates to mechanical rectifiers which efficiently convert bidirectional rotation to unidirectional rotation, and more particularly, to a screwdriver or tool which eliminates the wasted hand motion inherent in all ordinary hand tools by turning a tool bit at an end of a main shaft of the screwdriver or tool in a same selected direction, regardless of the direction of rotation of a main handle of the tool, and to energy-saving and energy-converting devices such as a wave-powered electrical generator.

BACKGROUND OF THE INVENTION

Common screwdrivers and other currently available manual tools such as wrenches and torque devices suffer from a severe inefficiency due to a limitation of the human hand which operates the tool—namely the inability of the human hand to turn continuously in one direction. Since the hand which turns the screwdriver handle can only rotate a limited angle, the operation of any common manual tool whose handle is coaxial with the tool's main shaft consists of a repetition of the following cycle: first, the hand rotates the handle in the desirable direction for obtaining the function intended (tightening or loosening a fastener); second, the hand is rotated in the opposite direction to reposition it for the next cycle. During the second portion of the cycle, no advance is effected in the ultimate purpose of the tool (either because the hand slipped over the handle without entraining it, or because the tool is equipped with a one-way clutch such as a ratchet, or because the tool bit was extracted from engagement with the fastener and later reinserted). Therefore, this hand return stroke during the second portion of the cycle is completely wasted. The repetitive waste amounts to 50% of the hand motion and of the time consumed for each fastening job.

In an attempt to reduce this huge waste, certain tools (devices) have been invented which permit rotation of a tool bit in a same desirable direction, independent of which way a handle of the device is rotated. Most of these tools are of the torque wrench type in which two handles are mounted radially with regard to the tool axis. They are equipped with a rotation-reversal mechanism based on two ratchets. Since each ratchet tooth extends a certain angular span and any rotation of an angle smaller than that tooth span is lost motion, these tools do not make full use of the motion of the human hand and thus cannot completely eliminate the wasted motion. While offering only limited angular motion benefits, some of these tools are quite complex and require a large space clearance for their operation.

U.S. Pat. No. 1,860,914 (Wellman), issued on May 31, 1932, and U.S. Pat. No. 4,507,990 (Lack), issued on Apr. 2, 1985, illustrate the characteristics of some of these devices. Both patents describe ratchet wrenches with radial handles and they rely on the ability of ratchets to be deactivated (by disengaging a pawl from the teeth of its ratchet wheel) in order to switch from one direction of rotation of a main shaft to the opposite direction.

Other patents, such as U.S. Pat. No. 2,542,015 (Ellison), issued on Feb. 20, 1951, and U.S. Pat. No. 2,641,136 (Marsden), issued on Jun. 9, 1953, relate to devices which are quite impractical, because they turn the output shaft at different speeds (and, therefore, with different torques) depending on whether the input handle is rotated clockwise (CW) or counterclockwise (CCW).

U.S. Pat. No. 4,970,915 (Williams III), issued on Nov. 20, 1990, discloses a system usually comprising a motor and a handle as independent inputs which impart to an output shaft a unidirectional rotation (reversible through switching of a system of pawls/toothed rings or of a clutch with polygonal plate/rollers).

U.S. Pat. No. 5,176,038 (Inokuchi), issued on Jan. 5, 1993, discloses a motion-converting mechanism wherein a linearly reciprocating motion of a radial handle is converted through racks and pinions into a unidirectional rotation of an output shaft due to the work of toothed one-way clutches which can be selectively deactivated to reverse rotation of the output shaft. In one embodiment, the radial handle becomes a radial spring-returned rack pusher.

While these and other patents do achieve a certain reduction in the amount of wasted motion, they are generally quite complicated and therefore costly, and some of them have additional shortcomings.

It is desirable to provide a simple, sturdy, and practical mechanical rectifier useful as part of a manually operated tool which eliminates the wasted motion besetting common screwdrivers, or as part of a wave-powered electrical generator.

SUMMARY OF THE INVENTION

The present invention is directed to an efficient mechanical rectifier which comprises a shaft, two driving elements mounted on the shaft, and a reversing mechanism (transmission) coupling the driving elements. The rectifier acts to efficiently convert back and forth rotation of one of the driving elements into a unidirectional rotation of the shaft.

In one specific application the present invention is directed to a manually operated screwdriver or tool which eliminates wasted human hand motion inherent in all common manually operated screwdrivers or tools. In another specific application the present invention is directed to an apparatus which converts the kinetic energy of ocean waves into electrical energy.

From one view, the present invention is directed to apparatus comprising a shaft, two driving elements, and a reversing mechanism. The two driving elements are mounted on the shaft. Each has a one-way clutch interposed between it and the shaft, with the clutches oriented so as to engage the shaft when turned in one direction and to overrun the shaft when turned in the opposite direction. The reversing mechanism couples the two driving elements together and forces them to always rotate in opposite directions so that one driving element entrains the shaft and the other driving element overruns the shaft, thus causing the shaft to always turn in only one direction, regardless of the direction of rotation of the driving elements.

From an other view, the present invention is directed to a screwdriver comprising a shaft, at least one tool bit adapted to be coupled to either end of the shaft, two driving elements, a handle adapted to be coupled to either one of the driving elements, and a reversing mechanism. The two driving elements are mounted on the shaft. Each has a one-way roller clutch interposed between it and the shaft, with the clutches oriented so as to engage the shaft when turned in one direction and to overrun the shaft when turned in the opposite direction. The reversing mechanism couples the two driving elements together and forces them to always rotate in opposite directions so that one driving element entrains the shaft and the other driving element overruns the shaft, thus causing the shaft to always turn in only one direction, regardless of the direction of rotation of the driving elements.

From still an other view, the present invention is directed to a telescopic handle comprising a pivotable clevis and extensible means. The pivotable clevis is attachable to a mounting means via a pivot pin for providing a selective swivel motion to the telescopic handle. The extensible means comprises at least inner and outer concentric elements which can slide longitudinally a certain linear stroke, with the inner element being coupled to the clevis by a pin, to allow a limited angular motion of the extended handle, whereby the handle can be extended sufficiently to permit the placement of the extended outer tubular element under the arm of a tool user, thus freeing one hand of the user for other functions.

The invention will be better understood from the following more detailed description taken with the accompanying drawings and claims.

DETAILED DESCRIPTION

All component parts of the various embodiments of the present invention are designated in the drawings by three-digit numbers: the first digit usually represents the embodiment of which it is a part, while the following two digits serve to identify various parts of the same embodiment. Components (elements) performing the same function in different embodiments have the same last two digits for reference numbers. When corresponding elements of different embodiments are essentially identical, they are given the same reference number.

Figure 1:
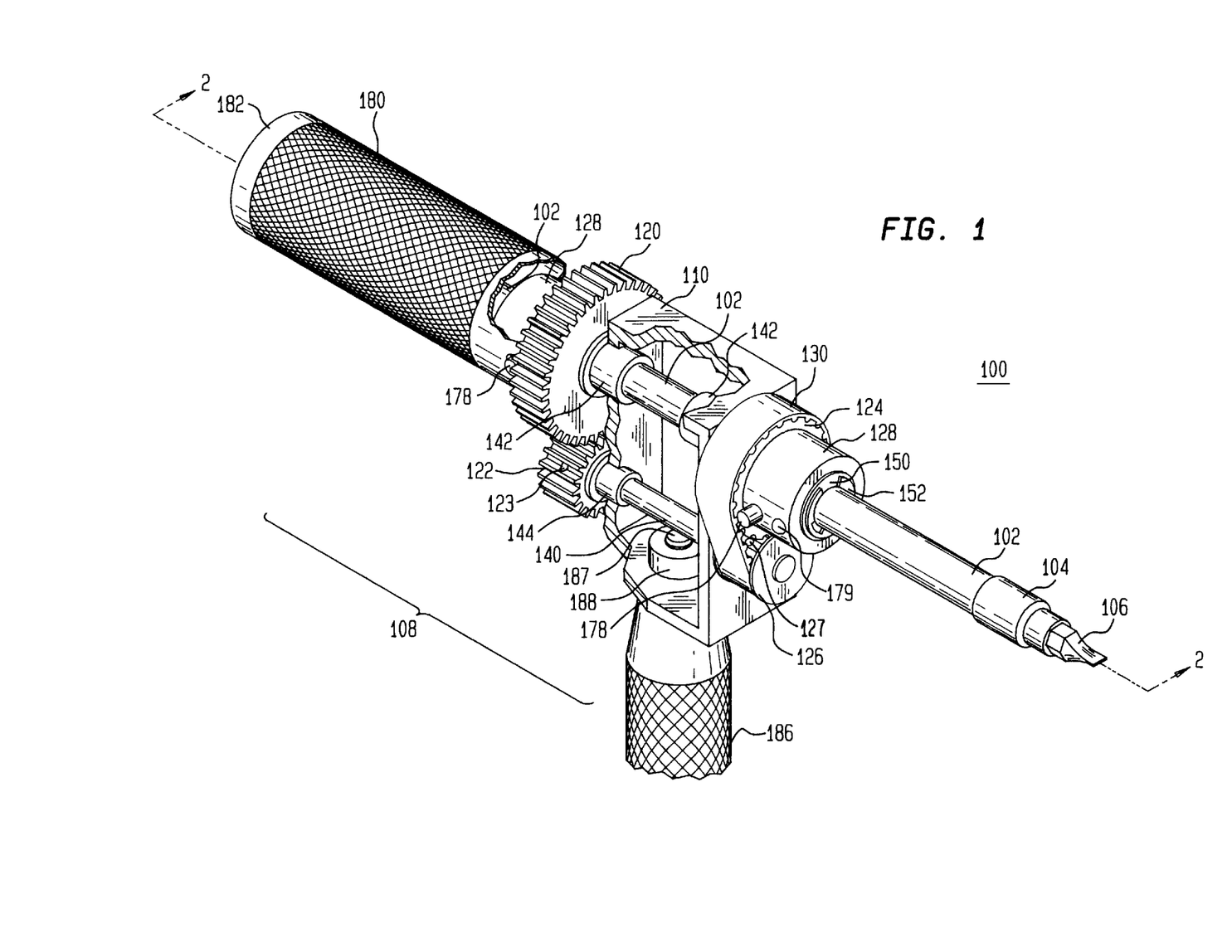
FIG. 1 is a perspective view of a screwdriver or tool in accordance with a first embodiment of the present invention, with a portion of a central hollow rectangular frame cut out to expose some internal details.
Figure 2:
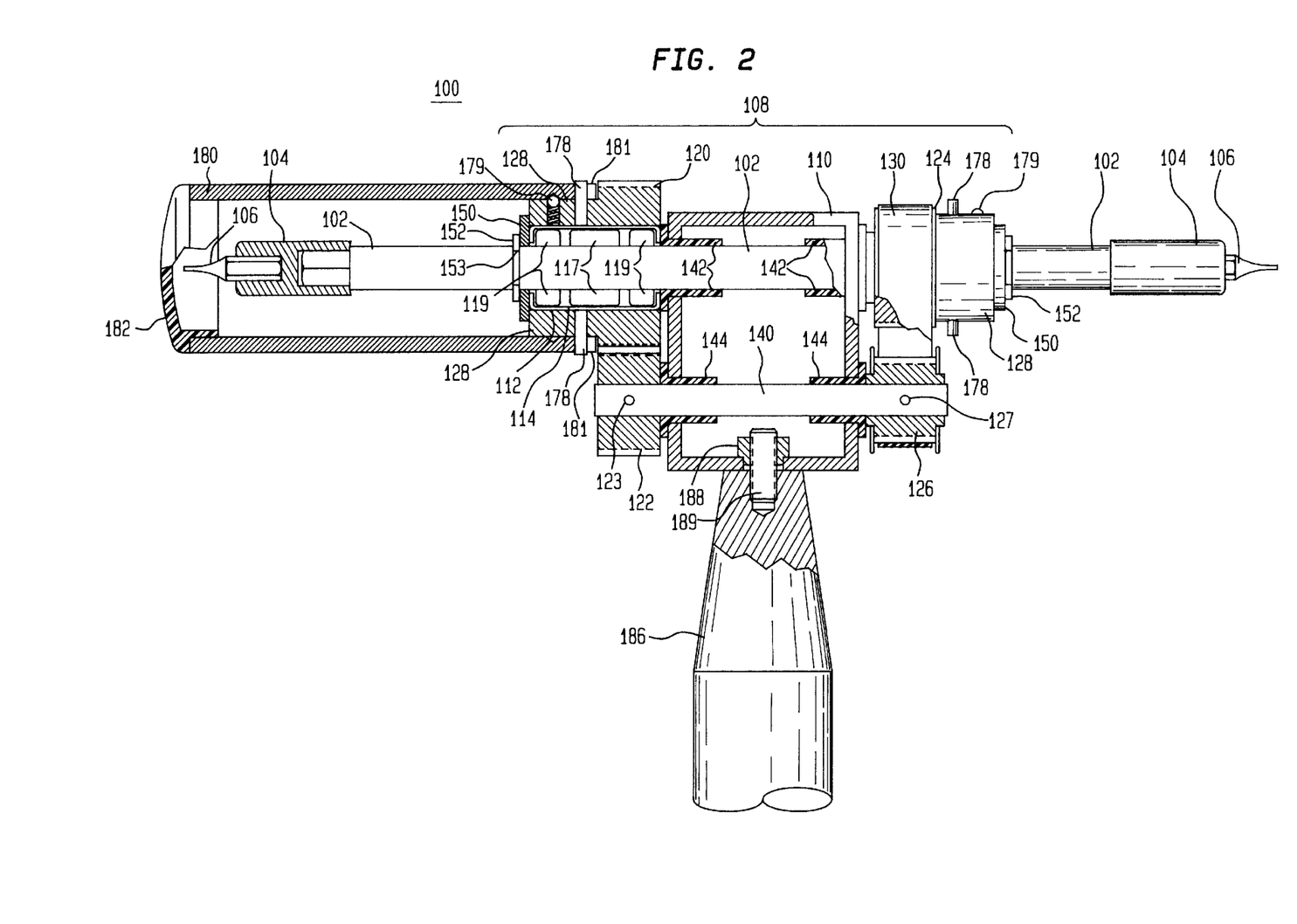
FIG. 2 is a side view of the screwdriver or tool of FIG. 1, through a dashed line 2—2 of FIG. 1, with a major portion shown axially sectioned.

FIGS. 1 and 2 show a perspective view and a side view (through a dashed line 2—2 of FIG. 1), respectively, of a screwdriver or tool 100 in accordance with a first embodiment of the present invention. In FIG. 1, a portion of a central, hollow, rectangular frame 110 has been cut out to expose internal parts, and in FIG. 2 a portion of the screwdriver or tool 100 is shown axially sectioned.

Screwdriver 100 comprises a main shaft 102 and a reversing mechanism 108, supported in the center by the hollow, rectangular frame 110. To enable the same screwdriver 100 to be used for a variety of fasteners, the main shaft 102 may be terminated at each end with a bit holder or adapter 104, in which one of a variety of tool bits, such as tool bit 106 can be inserted to suit the type of screwhead or nut being operated on. Another option is to have the main shaft 102 terminated with a dedicated tool bit at each end.

The reversing mechanism 108 comprises a gear transmission on one side of the central frame 110; a timing belt transmission on the other side of central frame 110, and an idler shaft 140 parallel with the main shaft 102. The main shaft 102 and the idler shaft 140 are supported by the hollow central frame 110 and are guided by flanged bushings pressed in opposite walls of the hollow frame 110 (two flanged bushings 142 guide main shaft 102, while two other flanged bushings 144 guide idler shaft 140). It is to be understood that bearings such as 142 and 144 can be either of the rolling-element type, such as ball bearings, which offer reduced friction, or they can be of the slider bearing (or bushing) type, which are more economical. Such bearing substitutions can also be made in screwdrivers or tools of other embodiments described hereinafter, and the tools so equipped remain within the scope of the present invention.

The reversing mechanism 108 comprises two driving elements mounted on the main shaft 102: a spur gear 120 on one side (forming part of the gear transmission) and a timing belt pulley 124 (forming part of the timing belt transmission) on the other side of the rectangular frame 110. Each of the driving elements 120 and 124 has a one-way roller clutch & bearing assembly 112 (shown only in FIG. 2) pressed in its bore and contacting the surface of main shaft 102.

Suitable one-way roller clutch & bearing assemblies 112 can be obtained from: The Torrington Co., in Torrington, Conn., and the INA Bearing Company, Incorporated, in Fort Mill, S.C., under the name: "Drawn Cup Roller Clutch & Bearing Assembly". Each clutch & bearing assembly 112 comprises a drawn cup 114 in which two sets of bearing rollers 119 straddle a set of clutch rollers 117 in the center. The sets of bearing rollers 117 and 119 are separated, guided, and retained by suitable roller cages in the drawn cup 114, and the clutch rollers 117 are spring-loaded in one direction against wedging ramps (not shown) in the drawn cup 114. This arrangement permits the clutch to operate in an "overrun mode" when rotated in one direction (without entraining the main shaft 102), and to operate in a "lock mode" when rotated in the opposite direction (entraining the main shaft 102). As this operation is performed with minimal lost motion (backlash), the user can operate the screwdriver or tool 100 with practically zero lost motion. The low profile of the radial section of these components allows for the compact and light construction of the "no-waste" screwdrivers or tools in accordance with the present invention.

It is to be understood that the one-way roller clutch and bearing assemblies can be substituted with just one-way roller clutches where suitable, using separate bearings where needed.

The gear transmission on one side of frame 110 comprises two spur gears 120 and 122. Spur gear 120 is a driving element with a one-way roller clutch & bearing assembly 112 pressed in its bore and riding on the main shaft 102. Spur gear 122 is an intermeshing idle gear affixed to idler shaft 140 by a cross pin 123.

The timing belt transmission on the other side of frame 110 comprises a driving timing belt pulley 124 (equipped with a one-way roller clutch 112 pressed in its bore in the proper orientation and mounted on the main shaft 102, as are all driving elements of the present invention), a double-flanged idle timing belt pulley 126 affixed to idle shaft 140 by a cross pin 127, and an interconnecting timing belt 130. The reversing mechanism 108 (as well as the reversing mechanisms provided in other embodiments of the present invention discussed below) insures that the two driving elements (e.g., elements 120 and 124) always rotate in opposite directions.

It is to be understood that the transmission elements described above for the reversing mechanism 108 can be replaced by any other suitable equivalent components. For example, the spur gears 120 and 122 could be replaced by helical gears or by herringbone gears, while the timing belt transmission could be substituted by a chain drive or by another suitable transmission with a tension element such as a flat belt, a V-belt, or a metal band.

In order to apply the same torque exerted by the user's hand to a tool bit 106 for either tightening or loosening a fastener, the ratio:

R=number of teeth of the driving gear 120/number of teeth of the idle gear 122 must be the same as (or very close to) the ratio:

R'=number of teeth of driving pulley 124/number of teeth of the idle pulley 126.

A hollow main handle 180, which may have a protective cap 182 at its outer end, can be inserted on the hub 128 of either driving elements 120 or 124. The main handle 180 has at its active end two opposing axial slots 181 which engage two radial pins 178 pressed in the hub 128 of each driving element (120 and 124), thus becoming capable to entrain the driving element on which it was inserted, whenever the handle 180 is rotated by the user's hand. The main handle 180 also has small grooves on its inner surface for nesting a ball detent 179 which is installed in the hub 128 of each driving element 120 and 124, thus insuring that the main handle 180 is retained on the hub of the driving element on which it has been inserted, until it is forcibly pulled out. It is to be understood that the means shown and described here for obtaining entrainment of the driving element and retention of the main handle can be replaced by other suitable means.

The name "driving element" given to spur gear 120 and to timing belt 124 only indicates that either of them can potentially become the active driver at any time when a main handle 180 is inserted on and engages the hub 128 of that element. When the main handle 180 is turned in a desired direction (the direction in which the user desires to turn the fastener being operated on), the one-way roller clutch 112 pressed in that driving element in the proper orientation locks on the main shaft 102, entraining it (and the fastener being operated on), while the opposite "driving element" (which is now actually a driven element), being driven in the reverse direction by reversing mechanism 108, only overruns the main shaft 102, due to the properly oriented one-way roller clutch 112 pressed in its hub. Conversely, when the main handle 180 is turned in a direction opposite to the one in which it is desired to turn the fastener, the one-way roller clutch 112 pressed in the proper orientation in the hub of the active driving element just overruns the main shaft 102, without entraining it, while the other driving element, being rotated in opposite direction by reversing mechanism 108, locks on and engages main shaft 102 in the desirable direction. Thus is achieved the main purpose of this mechanical rectifier: to efficiently rectify or convert the alternative clockwise (CW) and counterclockwise (CCW) rotation of the main handle into unidirectional rotational of the main shaft. As the main shaft 102 of the "no-waste" screwdriver in accordance with the present invention only rotates in one direction, a tool bit 106 at one end of main shaft 102 always serves to tighten a fastener, while the tool bit 106 at the other end of the main shaft always serves to loosen a fastener. To switch from tightening a fastener to loosening it (or vice versa), all the user has to do is pull main handle 180 out of engagement with one driving element and insert it onto the hub of the opposite driving element.

Figure 10:
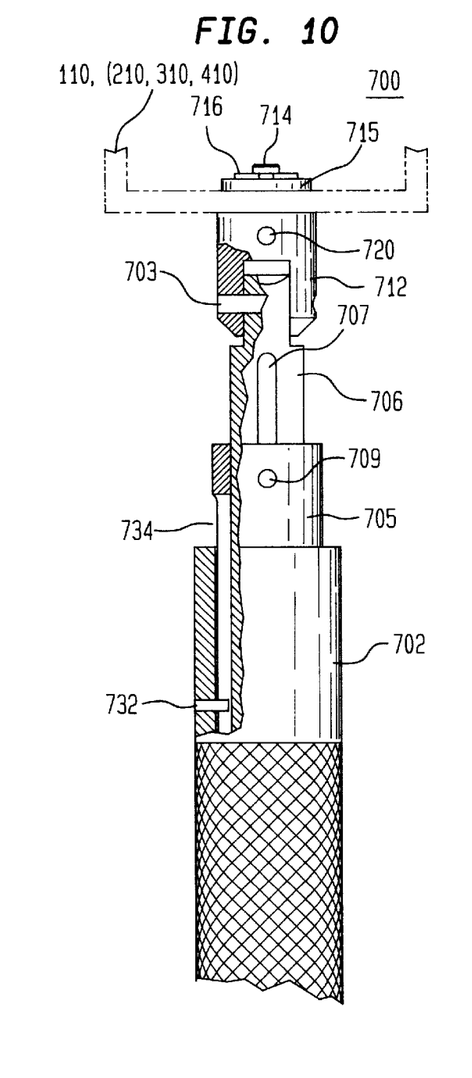
FIG. 10 is a side view of a telescopic holding handle, which can be optionally affixed to any of the embodiments shown in FIGS. 1 to 8 with a small portion thereof shown in axial section to reveal the inner components.
Figure 11:
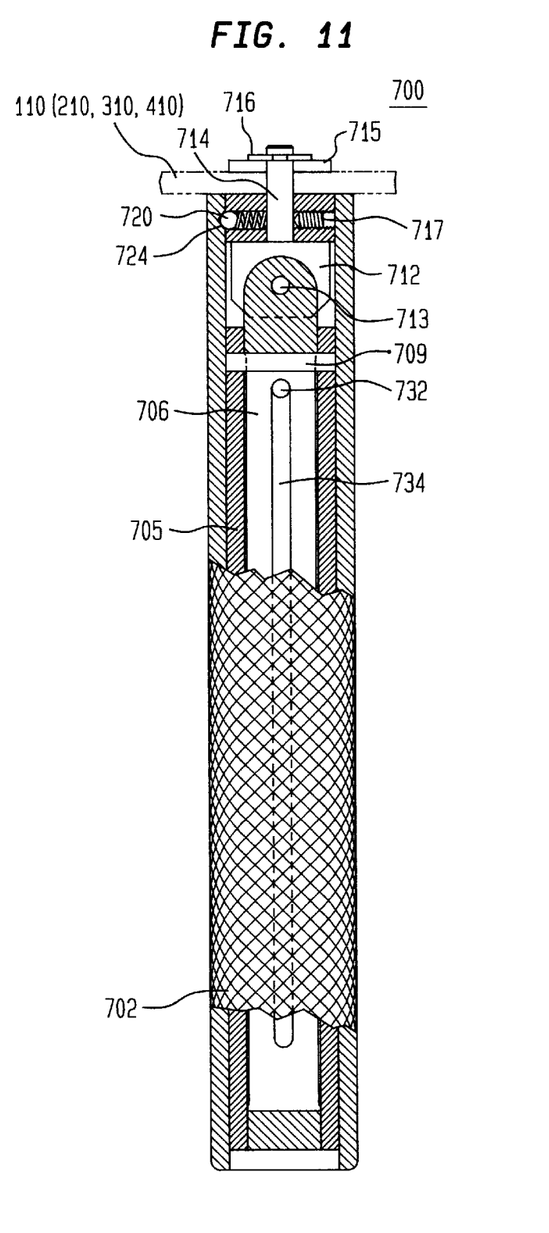
FIG. 11 is another side view of the telescopic handle (situated 90° from the view shown in FIG. 10), with portions of the handle shown in axial sections to expose the inner parts.

To manually hold or position the entire reversing mechanism 108, a radial holding handle is attached to the rectangular frame 110. The holding handle can be fixed, as is shown in FIGS. 1 and 2, where it is designated by reference number 186, or it can be extensible (telescopic), as is shown in FIGS. 10 and 11, where it is designated by number 700. The fixed holding handle 186 can be affixed to the frame 110 by a central threaded rod 187, which is securely fastened to the holding handle 186, being screwed into clinch nut 188, which is pressed into a hole in hollow frame 110. The telescopic handle 700 can be attached to the hollow frame 110, by having its pivoting pin 714 pass through a hole in frame 110, where it is held in place by thrust washer 715 and by external retaining ring 716.

It is to be understood that protective caps or guards (not shown—to avoid needlessly complicating the drawings) can be used where suitable in all embodiments of this invention, for example, to protect the fingers of the user of the screwdriver from being bruised by intermeshing gears.

Figure 3:
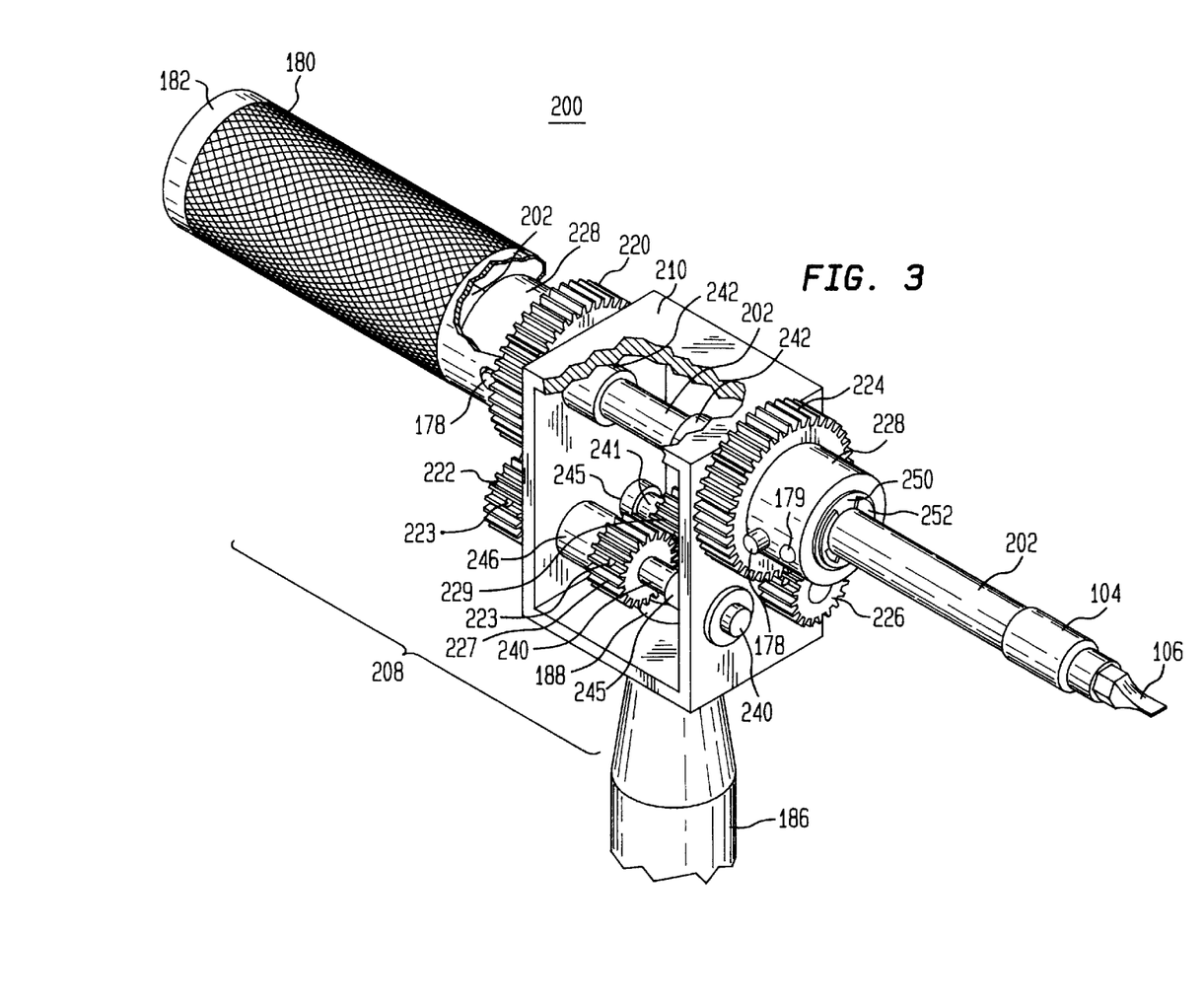
FIG. 3 is a perspective view of a screwdriver or tool in accordance with a second embodiment of the present invention, with a portion of a hollow rectangular frame thereof cut out to expose internal details.

FIG. 3 is a perspective view of a screwdriver or tool 200 in accordance with a second embodiment of the present invention, in which a reversing mechanism 208 comprises six spur gears 220, 222, 224, 226, 227, and 229, and two idler shafts 240 and 241. Two of these six gears, namely 220 and 224, are the driving elements (corresponding to the driving elements 120 and 124 of screwdriver 100 of FIGS. 1 and 2) and are mounted symmetrically on a main shaft 202, with their hubs 228 facing outwardly. Driving elements 220 and 224 are similar to driving element 120 of screwdriver 100 of FIGS. 1 and 2 and are equipped with identical one-way roller clutches 112 pressed in their bores in the same orientation and with radial pins 178 pressed in their hubs 228, as well as ball detents 179. The other four spur gears, 222, 227, 229 and 226 are similar to the idle spur gear 122 in screwdriver 100 of FIGS. 1 and 2, and are affixed to the two idle shafts 240 and 241 (two gears to each idle shaft) with cross pins 223. Idle shafts 240 and 241 are parallel to main shaft 202, and all three shafts 202, 240, and 241 are supported and guided by flanged bushings pressed in holes provided in the larger side walls of central, hollow, rectangular frame 210. Two flanged bushings 242 guide the main shaft 202, and four flanged bushings 245 guide the idle shafts 240 and 241 (two bushings for each idle shaft). The two idle shafts 240 and 241 are positioned so as to insure that associated gears intermesh with minimum backlash, and tubular spacers 246 (of which only one is visible in FIG. 3)

maintain the idle spur gears 227 and 229 in proper axial position for intermeshing with their mating gears. The other features of screwdriver or tool 200 are essentially the same as those described for the screwdriver or tool 100 of FIGS. 1 and 2.

Figure 4:
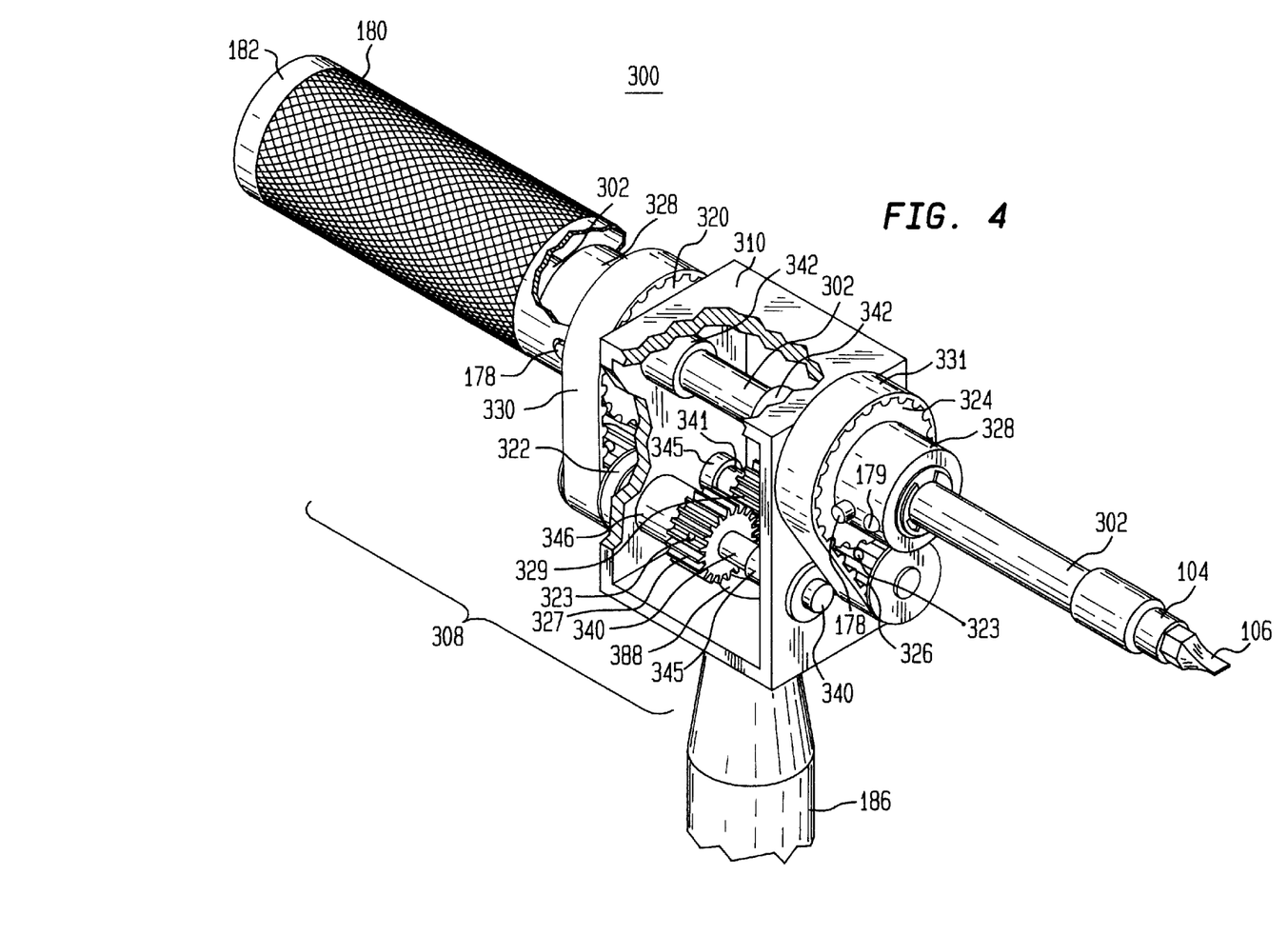
FIG. 4 is a perspective view of a screwdriver or tool in accordance with a third embodiment of the present invention, with a portion of a rectangular frame cut out to expose internal parts.

FIG. 4 is a perspective view of a screwdriver or tool 300 in accordance with a third embodiment of the present invention. The screwdriver or tool 300 comprises a reversing mechanism 308 having a timing belt transmission (similar to the one in tool 100 of FIGS. 1 and 2) on each side of a frame 310, with a reversing pair of idle spur gears 327 and 329 in the center, affixed with cross pins 323 to two idle shafts 340 and 341 and maintained in proper axial position with tubular spacers 346. The two timing belt transmissions comprise driving pulleys 320 and 324, double-flanged timing belt pulleys 322 and 326, and belts 330 and 331. Each of the double-flanged timing belt pulleys 322 and 326 are affixed to their respective idle shafts 340 and 341 with cross pins 323. The two idle shafts 340 and 341 are parallel to the main shaft 302 and are supported and guided by four flanged bushings 345, while the main shaft 302 is guided by two flanged bushings 342. The driving pulleys 320 and 324 are equipped with one-way roller clutch & bearing assemblies (shown only in FIG. 2 and designated 112) pressed in their bores, and their hubs 328 have radial cross pins 178 and ball detents 179, just as all other driving elements have in other embodiments of the present invention. The other components of screwdriver or tool 300 are the same as those described for the screwdriver or tool 100 and 200 of FIGS. 1, 2, and 3.

Figure 5:
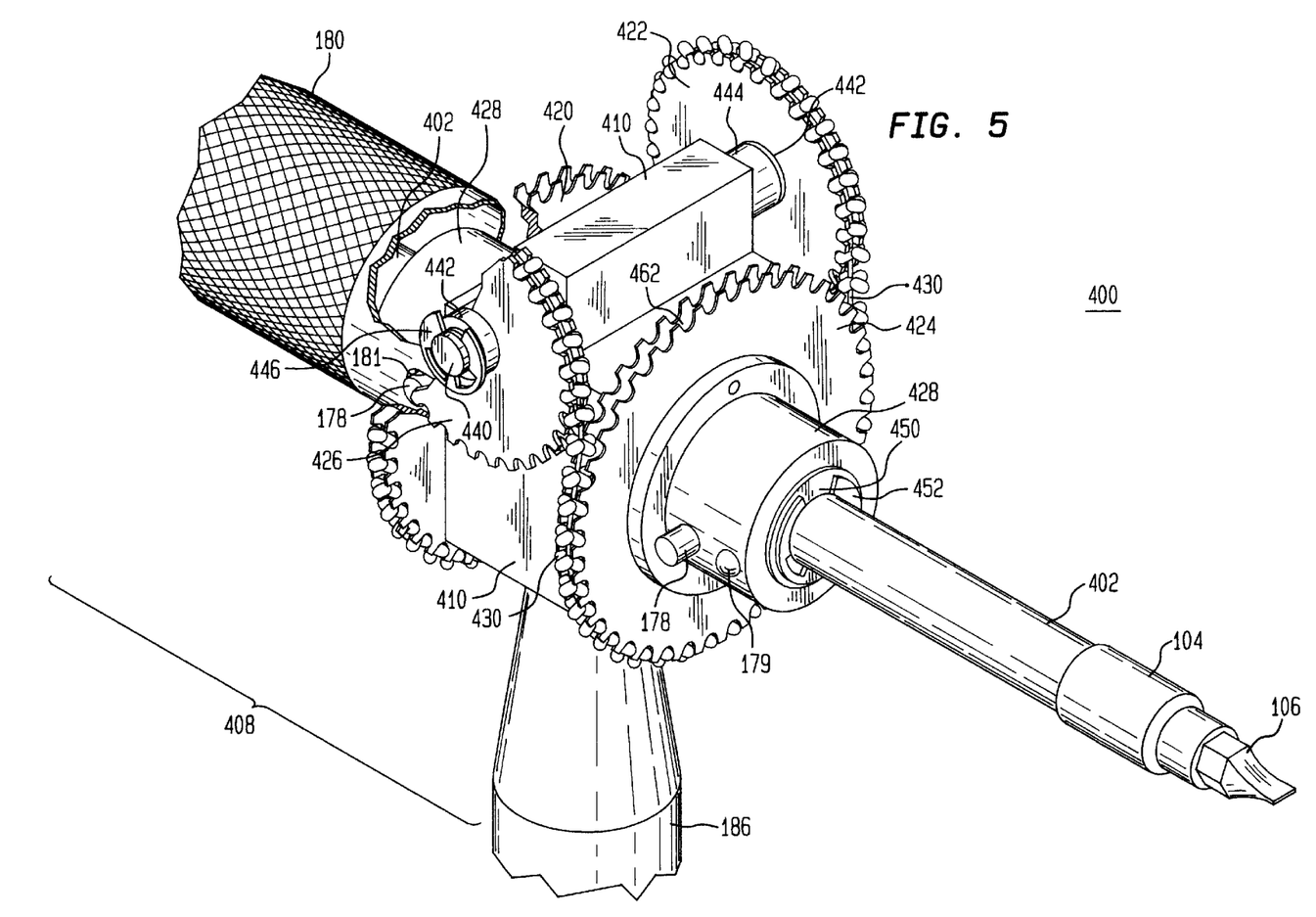
FIG. 5 is a perspective view of a screwdriver or tool in accordance with a fourth embodiment of the present invention, with some of the external parts partly cut out to expose some internal parts.

FIG. 5 is a perspective view of screwdriver 400, in accordance with a fourth embodiment of the present invention, in which a reversing mechanism 408 comprises a 3-D belt 430 threaded on 3-D pulleys 420 and 424 which are the driving elements of this embodiment and on idle 3-D pulleys 422 and 426. As the name implies, a 3-D belt is a tension element which can work not just in one plane, as any other (2-D) belt, but instead it can be threaded on pulleys in different planes. The 3-D belt 430 and pulleys 420, 422, 424, and 426 are obtainable from Winfred M. Berg, Inc. in Rockaway, N.Y. They have a pitch of 4 mm and a tensile strength of 50 lbs. and are suitable for this application.

Driving pulleys 420 and 424 have one-way roller clutch & bearing assemblies (shown only in FIG. 2 and designated 112) pressed in their bore, in the manner of the driving elements found in other embodiments of the present invention. Similarly, radial cross pins 178 and ball detents 179 are provided in hubs 428 of driving pulleys 420 and 424 for engagement with, and retention of main handle 180.

A central block 410 supports and guides the main shaft 402 through two flanged bushings (not visible in FIG. 5), which are similar to corresponding flanged bushings 142, 242 and 342 shown in FIGS. 2, 3, and 4, respectively. As in the other embodiments, the axial position of the driving elements 420 and 424 is maintained with minimal axial play by thrust bearings 450 and external retaining rings 452, inserted in grooves (not shown but similar to grooves 153 shown in FIG. 2) provided in the main shaft 402. The central block 410 also holds an idle pulley shaft 440 in a plane perpendicular to main shaft 402. The idle 3-D pulleys 422 and 426, with flanged bushings 442 pressed in their bore, are supported by the idle pulley shaft 440 and maintained in proper axial positions by tubular spacers 444, and by external retaining rings 446 inserted in suitable grooves provided in idle pulley shaft 440.

The central block 410 is equipped with suitable features to permit attachment to it of either the fixed radial holding handle 186 or the telescopic handle 700. The other features and components of screwdriver or tool 400 are similar to those described for the screwdriver or tool 100, 200, and 300 of FIGS. 1 through 4.

Figures 6, 8:
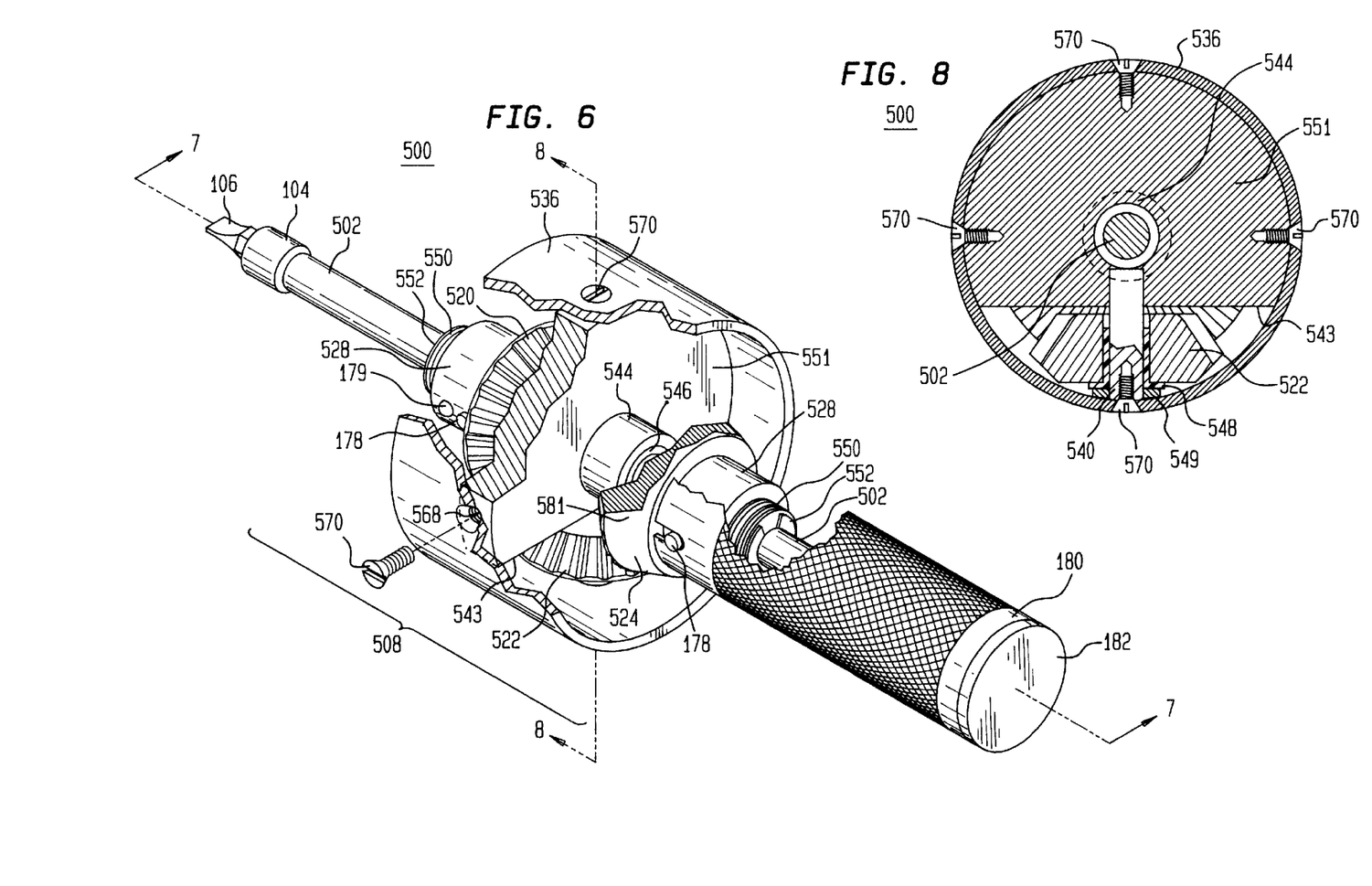
FIG. 6 is a perspective view of a screwdriver or tool in accordance with a fifth embodiment of the present invention, with a central housing and a holding sleeve shown partly cut out to expose some inner details.
FIG. 8 shows a central cross section through a dashed line 8—8 of FIG. 6 of the screwdriver or tool shown in FIG. 6.
Figure 7:
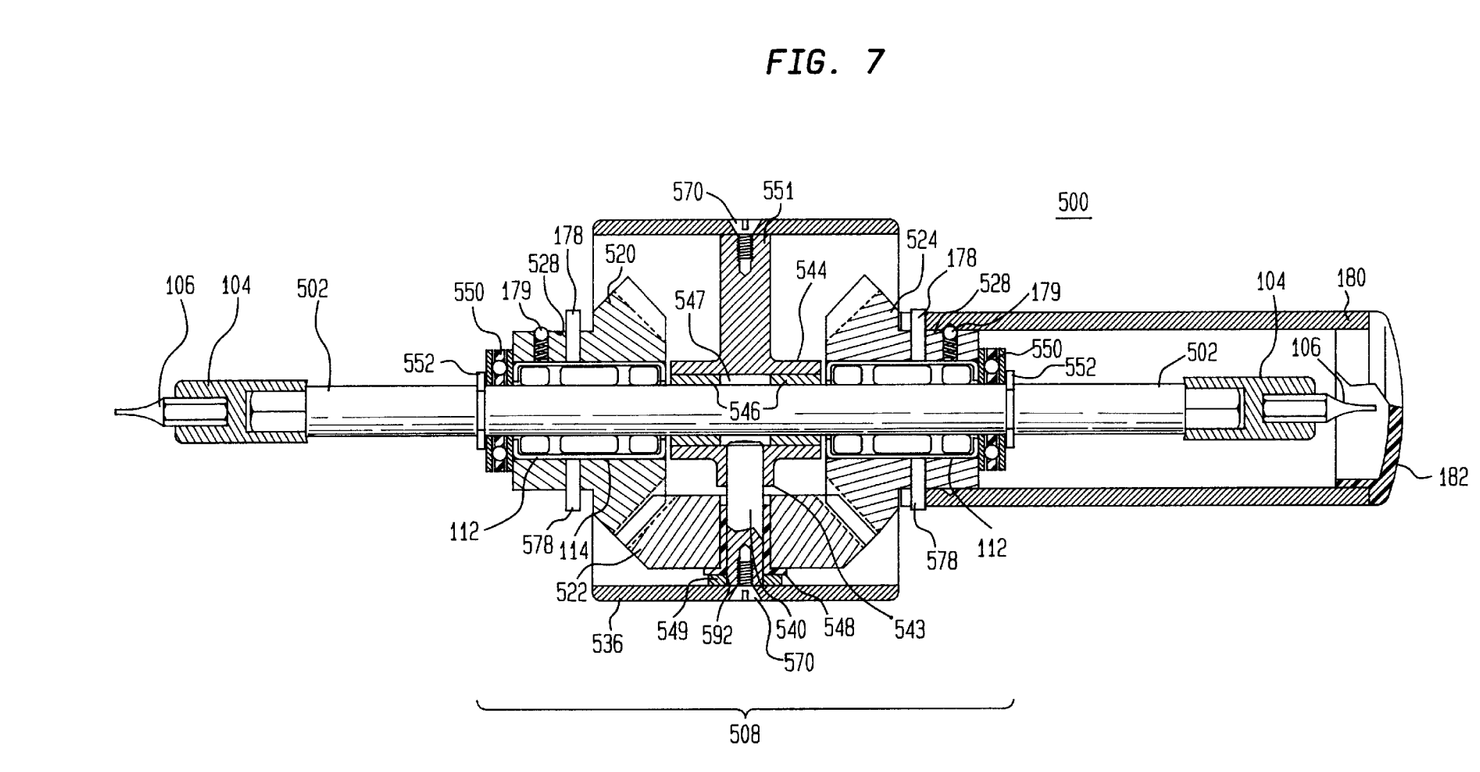
FIG. 7 shows an axial section through a dashed line 7—7 of FIG. 6 of the screwdriver or tool shown in FIG. 6.

FIGS. 6, 7, and 8 show three views of a screwdriver or tool 500 in accordance with a fifth embodiment of the present invention, in which a reversing mechanism 508 comprises three bevel gears 520, 522, and 524. FIG. 6 shows a perspective view of the tool 500; FIG. 7 shows an axial section through a dashed line 7—7 shown in FIG. 6; and FIG. 8 shows a central radial cross section through a dashed line 8—8 shown in FIG. 6. Screwdriver or tool 500 comprises a main shaft 502 that is guided by two bushings 546 which are pressed in a central bore 547 of a housing 544. The two bevel gears 520 and 524 are driving elements that straddle the central housing 544, and are equipped with the same components as the driving elements in the other embodiments described here (a one-way roller clutch & bearing assembly 112 pressed in the bore of each of the driving bevel gears 520 and 524 in the proper orientation, and cross pins 178 and ball detent 179 on a hub 528 of each driving element). Similarly, thrust bearings 550 and retaining rings 552 are used to axially position the driving elements 520 and 524 on the main shaft 502 and to withstand the axial forces generated when operating the tool.

The housing 544 has a narrower circular ridge 551 in its center, with a flat cutout 543 on one side. An idler shaft 540 is inserted in the radial bore provided in the center of flat cutout 543. The idler shaft 540 guides the idler bevel gear 522, which has flanged bushing 548 pressed in its bore. A holding sleeve 536 is fastened to the circular ridge 551 of housing 544 and to radial idler shaft 540. The fasteners used are four flat head screws 570, three of which are screwed into three suitable threaded holes machined at 900 to each other in the circular ridge 551, and the fourth screw is screwed into an axial threaded hole provided at the end of radial idler shaft 540. A washer 549 at the end of idler shaft 540 maintains idle gear 522 in the proper position. The flat heads of screws 570 are nested in four equally spaced holes machined in the central radial plane of holding sleeve 536 with adequate countersinks to allow the flat screwheads to lie flush on the outer surface of the holding sleeve 536. Thus equipped, the holding sleeve 536 conceals the reversing mechanism and protects a user's fingers from tangling with the gears 520, 522, and 524. Optionally, with minor modifications, a second idle gear (not shown), which functions like idle gear 522, can be added to increase strength of the reversing mechanism. The other features and elements in tool 500 are common to all embodiments shown and described above, and the operation is also essentially the same.

The screwdrivers 100, 200, 300, 400, and 500 of FIGS. 1, 2, 3, 4, 5, 6, 7, and 8 can be operated in one of the following modes:

1. If the main handle (for example, handle 180 of FIGS. 1 and 2) is rotated while the holding handle (for example holding handle 186 of FIGS. 1 and 2) is not held, then the tool operates like an ordinary screwdriver which wastes about 50% of hand motion.

2. If the main handle is rotated with one hand while the holding handle is held still (by holding it with the other hand or by other means such as holding it pinned between the user's body and his/her arm) then both CW and CCW rotations of the main handle cause the main shaft (for example shaft 102 of FIGS. 1 and 2) to turn unidirectionally in a selected direction. This eliminates the wasted hand motion and practically doubles the speed of the tool and thus cuts in half the time required for screwing a fastener in or out.

3. If the holding handle is rotated at the same time as the main handle, but in opposite direction, the speed of screwing the fastener is about four time faster than with a regular screwdriver.

It is to be noted that the torque exerted on a fastener by screwdrivers 100, 200, 300, 400, and 500 is the same as with a conventional screwdriver while the speed can be from two to four times faster.

Screwdrivers (tools) 100, 200, 300, 400, and 500 all provide the following advantages and features.

1. They eliminate wasted hand motion and wasted time in operation of the tools.
2. They offer relatively strong, reliable and long lasting construction.
3. They require little maintenance or no maintenance.
4. They require relatively small space clearance for operation.
5. They can be used with telescopic handle 700 which can be extended and squeezed between an arm and the body so as to free one hand for other functions, such as holding the parts being worked on.

Figure 9:
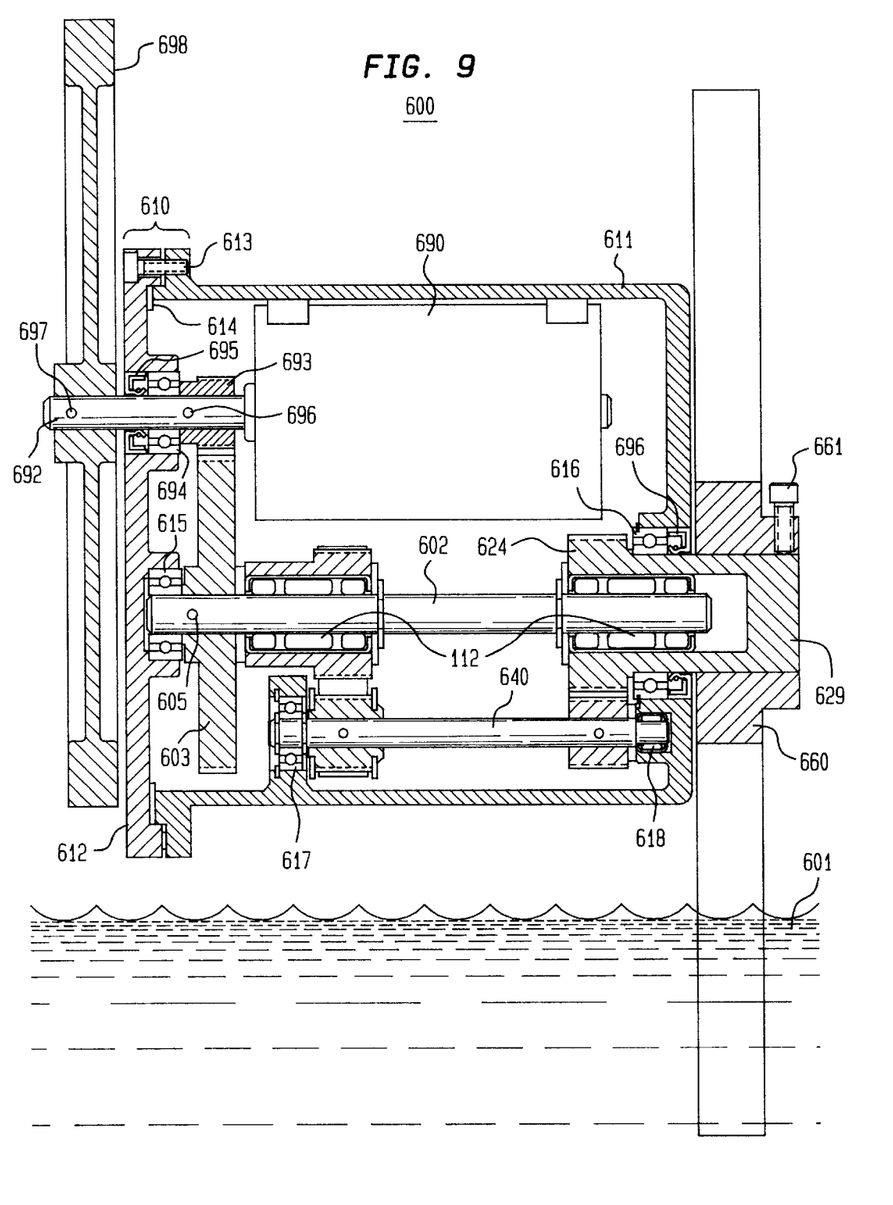
FIG. 9 shows a wave-powered electrical generator comprising a mechanical rectifier in accordance with the present invention.

FIG. 9 shows an axial section of an apparatus 600 in accordance with the present invention which converts the kinetic energy of ocean waves into electrical energy. In apparatus 600, an electrical generator 690 is driven by a main shaft 602 of an efficient mechanical rectifier through a speed increaser such as that formed by a large gear 603 affixed to main shaft 602 by cross pin 605 and by small gear 693 affixed to a shaft 692 of electrical generator 690 by cross pin 696. The efficient rectifier shown in FIG. 9 has a reversing mechanism similar to the one used in embodiment 1 (screwdriver 100 shown in FIGS. 1 and 2), but any of the reversing mechanisms used in the other embodiments described hereinabove could be used for the same purpose.

Apparatus 600 is enclosed and supported by a housing 610 which comprises a deep drum 611 and cover 612 assembled together by screws 613 and sealed by gasket 614. Elements 611 and 612 of housing 610 are equipped to support and guide the main shaft 602 through ball bearing 615 and the driving element 624 through ball bearing 616. Similarly, housing 610 supports and guides idler shaft 640 by ball bearing 617 and roller bearing 618. The elongated shaft 692 of the electrical generator 690 is guided by ball bearing 694, mounted in a bore provided in cover 612 and sealed by a radial dynamic seal 695 pressed in the same bore. A similar radial seal 696 is pressed through the bore in the bottom of housing drum 611, together with ball bearing 616. These components guide and seal the long hub 629 of driving element 624, to which a paddle wheel 660 is affixed on the outside with radial screws 661 (or by other means). During operation, part of the paddles of paddle wheel 660 are immersed under the surface 601 of ocean waves.

On the outside end of long shaft 692 of the electrical generator 690 a flywheel 698 is affixed by cross pin 697 (or by other means). Other components, such as anchoring means, pontoons, floats and tide-adapting linkages, which can be used with apparatus 600, are not shown to avoid needlessly complicating the drawing.

The speed increaser greatly enhances the speed of the electrical generator and the use of the flywheel maintains that speed within a narrow fluctuation range, because whenever paddle wheel 660 slows down and is temporarily immobile during rotation reversals, the one-way roller clutches 112 on main shaft 602 allow the faster moving flywheel 698 to overrun the slower moving paddle wheel 660. Minor components, such as washers and retaining rings, which are shown in FIG. 9, are not given reference numbers or specifically mentioned in this text to avoid needlessly lengthening the specification.

Thus equipped, apparatus 600 can be a practical electrical generator, extracting and converting the energy of wave motion in oceans and seas. As the wave move back and forth, it turns the paddle wheel 660 (or, optionally a propeller) CW and CCW. This constantly reversing motion is converted to unidirectional rotation by the efficient mechanical rectifier of the present invention. Beside driving an electrical generator, the mechanical rectifier of apparatus 600 could use wave energy for other purposes, such as water pumping, water filtering or desalination.

FIGS. 10 and 11 are a partial side view and an axial section, respectively, of a telescopic handle 700, which can be optionally used in place of the fixed holding handle such as 186 for any of the embodiments 1 , 2, 3, 4, and 5 shown above; the axial section shown in FIG. 11 is at 90° to the view shown in FIG. 10. The central housing of the tool to which the telescopic handle 700 is attached is shown in dashed line (because it is not part of the handle) and is numbered 110 (or 210, 310, 410). It is to be understood that telescopic handle 700 can be similarly attached to the outer sleeve 536 of tool 500. FIG. 10 shows the telescopic handle 700 partly extended, while FIG. 11 shows the handle in the compressed state. The telescopic handle 700 comprises three concentric elements: an outer tube 702, an intermediary tube 705, and a central rod (inner element) 706. The handle 700 can be extended by sliding one element on the other(s). The central rod 706 is attached to a clevis 712 by a clevis pin 713. The clevis 712 can be pivotally attached to the rectangular frames 110, 210, or 310 of tools 100, 200, or 300 shown in FIGS. 1 through 4, or to the central housing 410 of tool 400 shown in FIG. 5, or to the holding sleeve 536 of tool 500 (shown in FIGS. 6, 7, and 8) by a pivot pin 714, which is inserted axially in a suitable axial bore provided in clevis 712 and retained there by any suitable means as, for example, tightening a radial setscrew 717. The protruding end of pivot pin 714 can be inserted in a suitable hole provided in the central frame or housing or sleeve of the respective tools 100, 200, 300, 400, and 500 retained there by a thrust washer 715 and an external retaining ring 716 installed in a suitable groove in pivot pin 714.

When the telescopic handle 700 is in its compressed state (when its length is shortest), a ball detent 720, installed in a radial bore in clevis 712, engages a groove 724 formed in the inner surface of outer tube 702 and thus retains the handle 700 in its compressed state, until the handle is forcibly pulled out. The telescopic handle 700 is designed to permit three kinds of motions: (1) a swiveling motion about the axis of the pivot pin 714; (2) an angular motion about the clevis pin 713 (only possible after the outer tube 702 is sufficiently pulled out from the body of clevis 712); and (3) the telescopic outward pull to reach an available nesting place, such as under a user's arm and the opposite pushing motion to return the handle to its compressed state. To allow for the third (telescopic) motion, a cross pin 709 is pressed in diametrically opposed holes in intermediary tube 705 and passes through a long slot 707 in central rod 706; and another pin 732 (very short) is pressed in outer tube 702 and protrudes in a long slot 734 in intermediary tube 705. Thus equipped, the telescopic handle 700, attached to any of the tools 100, 200, 300, 400 and 500 described above, can be used either in a compressed mode, when it serves just as a solid handle, or it can be extended a certain linear stroke and its outer tube 702 placed under the user's arm, thereby freeing one hand for other functions.

It is to be understood that the specific embodiments described here are only illustrative of the general concepts and principles of the invention and that various modifications may be made by those skilled in the art and still remain within the purview set forth for the present invention. For example, any other tool such as, for example, a wrench or torque device can use the concepts and mechanisms described in the present invention. Still further, a device similar to the apparatus 600 shown in FIG. 9 can be used to efficiently convert alternating back and forth motion into unidirectional rotation of a shaft.

I claim:

1. Apparatus (100 200, 300, 400, 500 600) comprising:
   a shaft;
   two driving elements (120, 124, 220, 224, 320, 324, 420, 424, 520, 524, 624) mounted on the shaft, each having a one-way clutch (112) interposed between it and the shaft, with the clutches oriented in the same way on the shaft so that the shaft is always entrained in only one direction of rotation when either one of the two driving elements is rotated in that direction, and the shaft is overrun by a driving element that is rotated in the opposite direction;
   a rotation means positioned along the axis of said shaft and engaging a selected one of said driving elements; and
   a reversing mechanism coupling the two driving elements together and forcing them to always rotate in opposite directions so that one driving element entrains the shaft and the other driving element overruns the shaft, thus causing the shaft to always turn in only one direction, regardless of the direction of rotation of the driving elements.

2. Apparatus comprising:
   a shaft;
   two driving elements mounted on the shaft, each having a one-way clutch interposed between it and the shaft, with the clutches oriented in the same way on the shaft so that the shaft is always entrained in only one direction of rotation when either one of the two driving elements is rotated in that direction, and the shaft is overrun by a driving element that is rotated in the opposite direction;
   a rotation means being coupled to one of the driving elements for rotating said driving element clockwise and counterclockwise;
   a reversing mechanism coupling the two driving elements together and forcing them to always rotate in opposite directions so that one driving element entrains the shaft and the other driving element overruns the shaft, thus causing the shaft to always turn in only one direction, regardless of the direction of rotation of the driving elements;
   an electrical generator (690) coupled to the shaft (602); and
   the rotation means being a wheel (660) having radial blades.

3. The apparatus of claim 1 being a tool for applying rotational movement to a workpiece, said tool further comprising means attached to at least one extremity of said shaft for receiving a tool bit, and wherein:
   the two driving elements are spaced apart on the shaft; and
   the two one-way clutches are one-way roller clutches, each one-way roller clutch being pressed in a bore of the associated driving element.

4. The tool of claim 3 wherein said rotation means comprises a main handle (180) selectively coupled to either one of the driving elements for rotating it clockwise and counterclockwise.

5. The tool of claim 4 further comprising a mounting means for supporting components of said tool, said mounting means being susceptible of rotation about said shaft, said main handle being coupled to a selected one of said driving elements for receiving user rotational inputs in clockwise and counterclockwise directions, said shaft rotating in response to said user inputs in only a single desired direction associated with said selected one of said driving elements, said shaft rotation occurring (a) only when said main handle is rotated in said desired direction when said mounting means is not constrained from rotating, said shaft rotation occurring at a rate substantially equal to that of a conventional hand tool;
   (b) when said main handle is rotated in both said clockwise and counterclockwise directions while said mounting means is constrained from rotating, said shaft rotation occurring at a rate approximately double that of a conventional hand tool; and
   (c) when said main handle is rotated in both said clockwise and counterclockwise directions and said mounting means is rotated in all cases in a direction opposite to said rotation of said main handle, said shaft rotation occurring at a rate approximately four times that of a conventional hand tool.

6. The tool of claim 3 wherein:
   one driving element is a first spur gear and the other driving element is a first pulley; and
   the reversing mechanism comprises:
   an axle disposed parallel to and in a predetermined spaced-apart relationship with the shaft;
   a second spur gear and a second pulley affixed on opposite ends of the axle so that the second spur gear intermeshes with the driving spur gear on one side of the shaft, and the second pulley is positioned for being driven by the first driving pulley via a belt; and
   a belt coupling the first pulley with the second pulley.

7. The tool of claim 3 wherein:
   the two driving elements are spur gears; and
   the reversing mechanism comprises:
   two axles disposed parallel to and in predetermined spaced-apart relationship with each other and with the shaft;
   two idle spur gears, each idle spur gear being affixed to one end of each axle, but on opposite sides, so that each of the two idle spur gears intermeshes with a separate one of the driving spur gears mounted on the shaft; and
   two intermeshing idle spur gears affixed to the center of the two axles.

8. The tool of claim 3 wherein:
   the two driving elements are pulleys; and
   the reversing mechanism comprises:
   two axles disposed parallel to and in a predetermined spaced-apart relationship with each other and with the shaft;
   two idle pulleys, each idle pulley affixed to one end of each axle, but on opposite sides, each of these two idle pulleys being positioned so as to be driven by the driving pulleys situated on the same side, via a belt;
   two belts, each belt coupling a driving pulley with an idle pulley; and
   two intermeshing spur gears affixed to the center of the two axles.

9. The tool of claim 3 wherein the two driving elements are 3-D pulleys and the reversing mechanism comprises:
  an axle disposed in a plane perpendicular to and in a predetermined spatial relationship to the shaft;
  two idle 3-D pulleys mounted on opposite ends of said axle; and
  a 3-D belt coupling the two driving 3-D pulleys and the two 3-D pulleys.

10. The tool of claim 3 wherein the driving elements are spaced-apart bevel gears and the reversing mechanism comprises:
  an axle disposed in a central plane, perpendicular to the shaft; and
  an idle bevel gear mounted on said axle and engaging the two driving bevel gears.

11. The tool of claim 3, further comprising:
  a mounting means for supporting components of the tool; and
  a holding handle selected from a group consisting of a fixed handle and a telescopic handle, said holding handle being attached to the mounting means.

12. The tool of claim 11 wherein the holding handle is a telescopic handle comprising:
  a pivotable clevis which can be attached to the mounting means of the tool via a pivot pin for providing swivel motion to the telescopic handle;
  extensible means comprising at least inner and outer concentric elements which can slide longitudinally a certain linear stroke, with the inner element being coupled to the clevis by a pin, to allow a limited angular motion of the extended handle, whereby the handle can be extended sufficiently to permit the placement of the extended outer tubular element under the arm of a tool user, thus freeing one hand of the user for other functions.

13. The tool of claim 12 wherein the extensible means of the telescopic handle comprises at least one intermediary concentric element slidably coupled to the adjacent concentric elements so as to permit longer extension of the handle, while providing a short length for the handle in its compressed mode.

14. The tool of claim 12 wherein the adjacent concentric elements of the telescopic handle are provided with a longitudinal slot in one element and a pin radially affixed to the other element and protruding into the adjacent longitudinal slot, to limit the extension stroke and prevent unintentional separation of the concentric elements.

15. The tool of claim 12 wherein the pivotable clevis of the telescopic handle comprises a ball detent for engaging a groove provided in the inner surface of the outer concentric element, for temporarily maintaining the handle in radial, compressed position.

16. A driving tool comprising:
  a shaft;
  means attached to at least one extremity of said shaft for receiving a tool bit;
  two driving elements mounted on the shaft, each having a one-way clutch interposed between it and the shaft, with the clutches oriented in the same way on the shaft so that the shaft is always entrained in only one direction of rotation when either one of the two driving elements is rotated in that direction, and the shaft is overrun by a driving element that is rotated in the opposite direction;
  a reversing mechanism coupling the two driving elements together for forcing them to always rotate in opposite directions so that one driving element entrains the shaft and the other driving element overruns the shaft, thus causing the shaft to always turn in only one direction, regardless of the direction of rotation of the driving elements; and
  a handle positioned in coaxial relation with said shaft and coupled to either one of the two driving elements so that, with said handle coupled to a first driving element a workpiece being operated on is rotated in a first direction, and, with said handle coupled to the other of the two driving elements the workpiece is rotated in the opposite direction.

* * * * *